US009355159B2

(12) United States Patent
Sage et al.

(10) Patent No.: US 9,355,159 B2
(45) Date of Patent: May 31, 2016

(54) SYSTEMS AND METHODS FOR ADAPTIVE DATA VISUALIZATION UTILIZING A QUICK FILTER PATTERN

(75) Inventors: Katharina Sage, Mannheim (DE); Andreas Riehl, Wiesloch (DE); Michael Belenki, Karlsruhe (DE); Henrik Arndt, Frankfurt (DE)

(73) Assignee: SAP SE, Walldorf (DE)

( * ) Notice: Subject to any disclaimer, the term of this patent is extended or adjusted under 35 U.S.C. 154(b) by 263 days.

(21) Appl. No.: 13/557,407

(22) Filed: Jul. 25, 2012

(65) Prior Publication Data

US 2014/0033079 A1   Jan. 30, 2014

(51) Int. Cl.
| | |
|---|---|
| *G06Q 10/10* | (2012.01) |
| *G06F 17/30* | (2006.01) |
| *G06Q 10/06* | (2012.01) |
| *G06F 9/44* | (2006.01) |

(52) U.S. Cl.
CPC .... *G06F 17/30572* (2013.01); *G06Q 10/06393* (2013.01); *G06F 8/34* (2013.01); *G06Q 10/10* (2013.01)

(58) Field of Classification Search
CPC ........... G06Q 30/02; G06Q 10/10; G06F 8/34
USPC ........................................................ 715/760
See application file for complete search history.

(56) References Cited

U.S. PATENT DOCUMENTS

| | | | | |
|---|---|---|---|---|
| 6,092,049 A | * | 7/2000 | Chislenko et al. | 705/7.29 |
| 2004/0168115 A1 | * | 8/2004 | Bauernschmidt | G06F 17/2241 715/238 |
| 2006/0026145 A1 | * | 2/2006 | Beringer et al. | 707/3 |
| 2009/0089248 A1 | * | 4/2009 | Alexander et al. | 707/3 |
| 2010/0333024 A1 | * | 12/2010 | Chan | G06F 17/30867 715/816 |

* cited by examiner

*Primary Examiner* — Jennifer To
*Assistant Examiner* — Ashley Fortino
(74) *Attorney, Agent, or Firm* — Buckley, Maschoff & Talwalkar LLC

(57) ABSTRACT

A method for adaptive data visualization includes accessing business intelligence data stored in a database, providing an interactive web browser having a filter pane and a result display pane, the filter pane containing a list of characteristics and/or key figures, receiving a user's selection of a parameter associated with the characteristics or the key figures, adaptively filtering the accessed data the selection, where the first selection triggers the adaptive filter to filter the data, displaying results of the adaptive filtering in the result display pane, receiving a second selection from among the parameters, adaptively filtering the accessed data based on the first selection and the second selection, the second selection triggering the adaptive filter, and modifying the displayed results based on the adaptive filtering results of the first and the second selections. A system to implement adaptive data visualization and a computer readable medium containing executable instructions are also described.

17 Claims, 4 Drawing Sheets

SYSTEMS AND METHODS FOR ADAPTIVE DATA VISUALIZATION UTILIZING A QUICK FILTER PATTERN

BACKGROUND

A Business Information Warehouse ("Business Warehouse" or "BW") can be a packaged, comprehensive business intelligence product built upon a data warehouse. A BW can include a combination of databases and database management tools used to support decision making by a user. Along with the data warehouse infrastructure, a BW can supply preconfigured data extractors, analysis and report tools, business process models, automated data extraction and loading routines, a metadata repository, administrative tools, etc.

A user can access the BW and use a reporting tool to work with data in the BW database. A browser can provide an organized interface where a user can access and work with data assigned to them in the Business Information Warehouse, such as workbooks, links, and reports. A user can be provided the ability to examine BW data that is segmented into discrete areas of data and associated metadata—for example, when comparing financial data for different fiscal years.

DETAILED DESCRIPTION

A system and method can provide an interactive web browser or graphical user interface (GUI) (collectively "web browser"), with the ability to filter large amounts of business intelligence (BI) data in an efficient manner so as to trigger actions and display a filtered result set on the interactive web browser.

The web browser can be implemented with custom user interface building blocks that a user can interact with to define filtering parameters for one or more adaptive filters that act on data accessed from a business warehouse database. A filter pane can include different lists (AccordionItems) that can be expanded and collapsed to save display space. These different lists can be visualized in a stack-like panel (HorizontalAccordionControl). In one embodiment, as selections are made the filter pane can be expanded from left to right, and then compressed by de-selection from right to left (or conversely right-to-left/left-to-right, up-to-down/down-to-up, etc.). The selection paradigm can be achieved by a single action to select as well as to unselect—for example, by a single-click of a user pointer device, a single touchscreen action, a shortcut key(s) selection, etc.

Selecting a characteristic and/or a key figure in the expanded list opens a parameter list from which parameters can be selected to interactively adapt a filter for that characteristic and/or key figure. The parameter list contains single values of the selected characteristic and/or key figure at the right. Deselecting will dispose of the new list. The parameter list for each selected characteristic and/or key figure represent the actual filtering functionality that can adapt the filter. The parameter list can open with none of the values selected (equals all values selected). Selecting one or more parameter values triggers the adaptive filtering process. With each selection, one or more adaptive filters can be configured based on the selected parameter(s). The results of the adaptive filter can be updated in a result display portion of the interactive GUI (e.g., in table, chart, graph, or other forms of data representation). In addition to the features of the characteristic list, the quick filter list can contain text input fields with immediate response to narrow down the list of available filter values. Return will optionally select the current result set. Selecting/deselecting all values at once is possible as well as sorting by ID/Name.

Embodying systems and methods provide a user with the ability to narrow large amounts of data to a meaningful result set by selecting parameters that adaptively filter the data. The adaptive filtering can trigger specific actions in accordance with the selected parameter(s) on the full result set or on a selected part of it.

Figure 1:
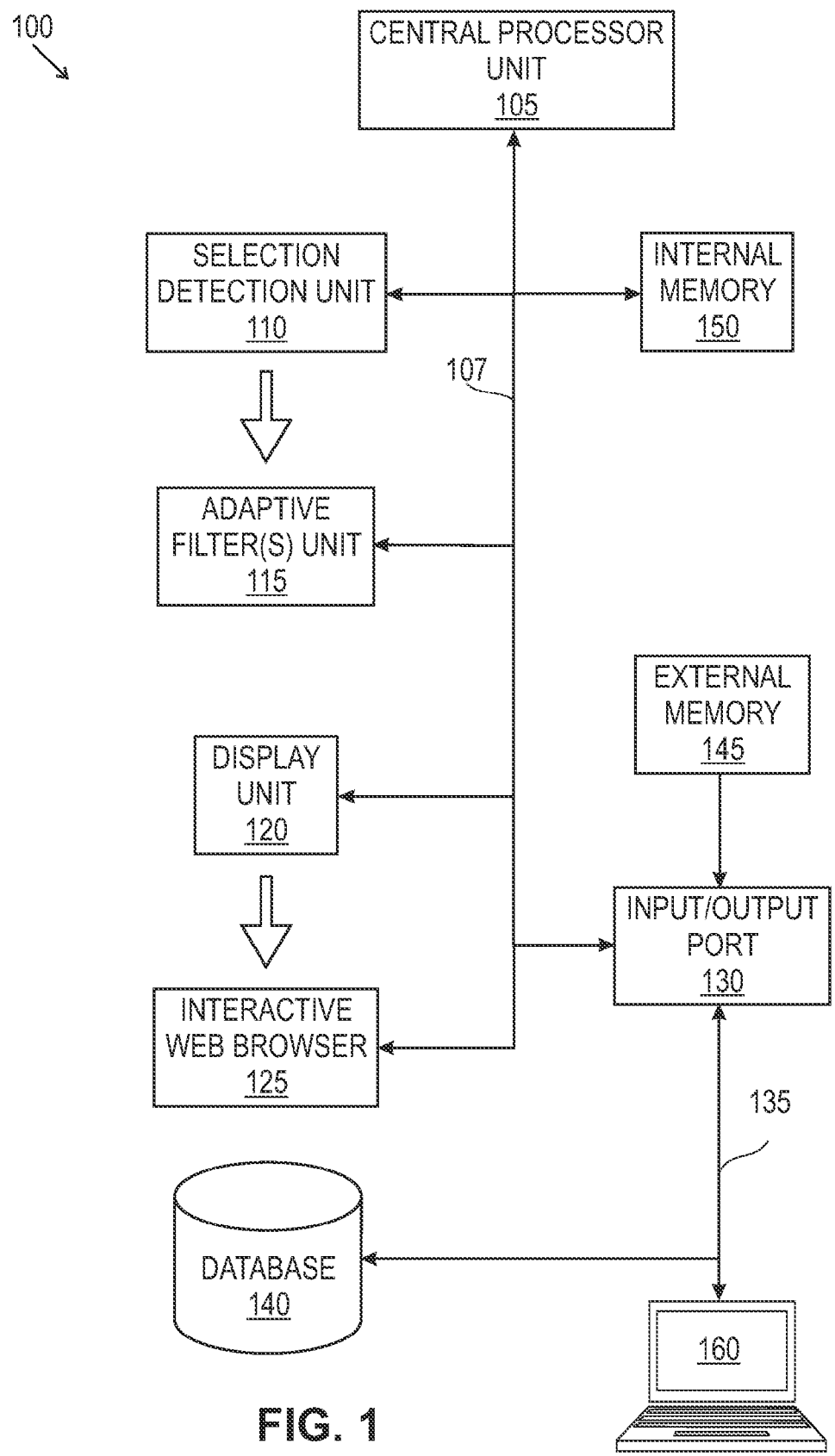
FIG. 1 depicts a system in accordance with an embodiment.

FIG. 1 depicts system 100 in accordance with an embodiment. System 100 can include central controller or central processor unit 105 which can be a processing unit, a field programmable gate array, discrete analog circuitry, digital circuitry, an application specific integrated circuit, a digital signal processor, a reduced instruction set computer processor, etc. Processor unit 105 interconnects and communicates with other components of system 100 via internal bus 107. System 100 can communicate with database 140 via electronic communication network 135 through input/output (I/O) port 130. Electronic communication network 135 can be the Internet, a local area network, a wide area network, a virtual private network, a wireless area network, or any other suitable configuration of an electronic communication network.

In one embodiment, system 100 can be implemented in a computing device, which is in communication with database 140 via electronic communication network 135. In another embodiment, system 100 can be implemented in a server (not shown) that is in communication with database 140 and a remote computing device 160 via the electronic communication network. The computing device and/or remote computing device can be a personal computer, notebook computer, server computer, mainframe computer (or terminal), thin client, networked computer, handheld computer, personal digital assistant, tablet computer, workstation, mobile phone, or similar device.

System 100 may include internal memory 150 connected to internal bus 107. Internal memory 150 for convenience represents both volatile and non-volatile memory devices. External memory 145 may be connected to processor unit 105 via input/output (I/O) port 130. Processor unit 105 may access a computer application program stored in non-volatile internal memory, or stored in external memory 145. The computer program application may include code or executable instructions that when executed may instruct or cause processor unit 105 to perform methods discussed herein such as a method of providing an interactive web browser that includes a filter pane, a results display pane and adaptive filters to filter accessed business intelligence data, where the adaptive filters are triggered and modified by user selection of one or more parameters presented in the filter pane. Dedicated hardware, software modules, and/or firmware can implement the components of system 100.

Figure 2:
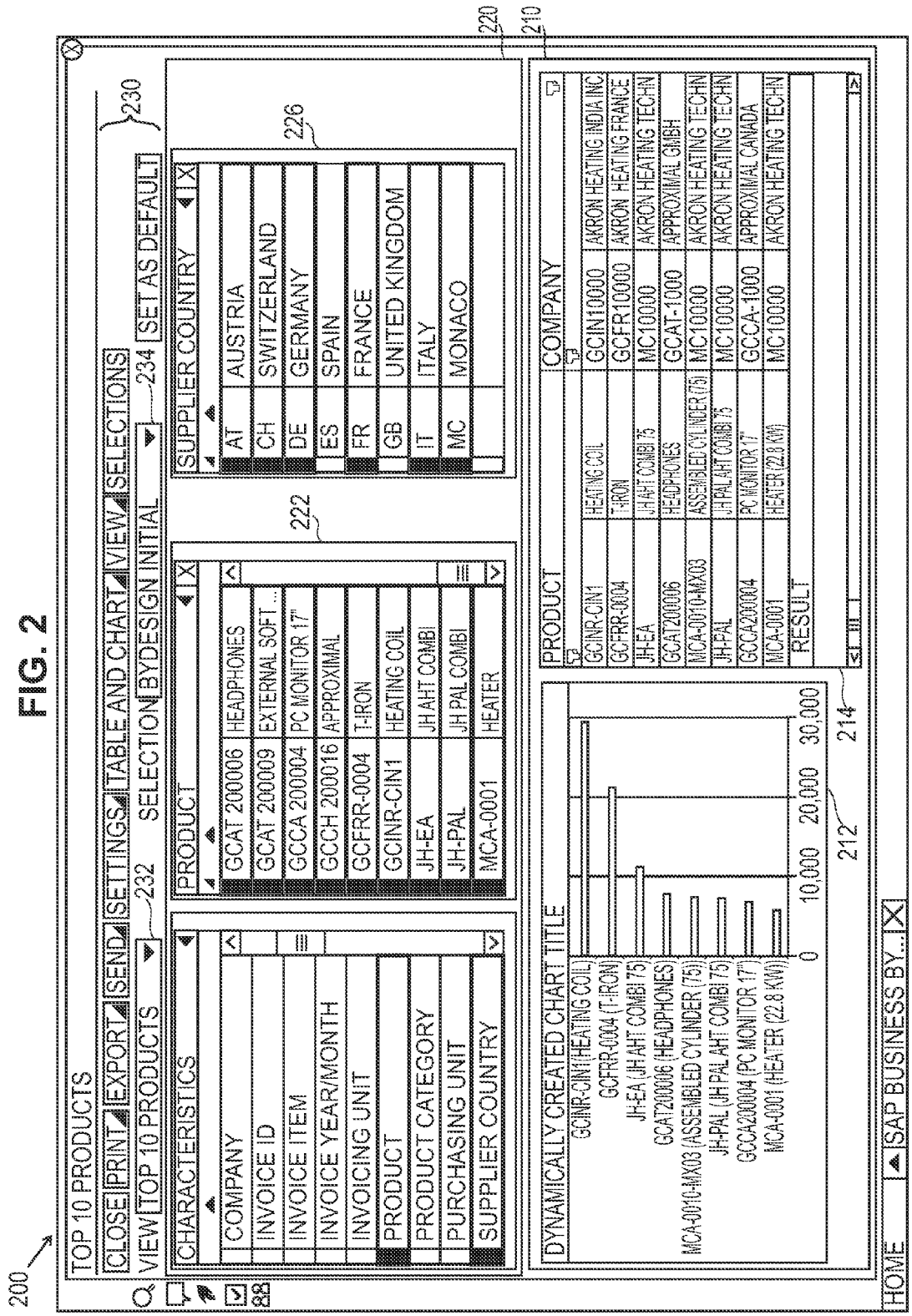
FIG. 2 depicts an interactive web browser interface in accordance with an embodiment.

System 100 can include selection detection unit 110 that can monitor the interactive web browser 125 for user selection(s) of parameters in the filter pane (FIG. 2, item 220). The user selection can be made with a pointing device, touch screen, function key, etc. When a selection is detected, selection detection unit 110 communicates the selection to adaptive filter unit 115.

Adaptive filter unit 115 can include or implement a filter and/or a bank of filters. A set of accessed business intelligence data selected by the user from database 140 can be adaptively filtered by the one or more filters of the adaptive filter unit. Adaptive filter unit includes predetermined filter descriptions and algorithms that describe filter (and/or sort) functions to be performed on the accessed business intelligence data. The filter descriptions include criteria that when implemented cause the filter(s) to display data conforming to the criteria (inclusionary or exclusionary filter functions can be implemented). When a user selection is detected and then communicated to the adaptive filter unit, the adaptive filter unit is triggered to implement the filter description corresponding to the parameter selected by the user. This implementation by the adaptive filter unit is near to instantaneous with the user's selection of the parameter. Display unit 120 monitors the adaptive filter unit output and provides graphic information to interactive web browser 120 for display in a result display pane (FIG. 2, item 210).

FIG. 2 depicts interactive web browser interface 200 in accordance with an embodiment. Depicted in FIG. 2 are three separate areas of the web browser: filter pane 220; result display pane 210; and toolbar 230. Result display pane can include a chart display area 212 and a table display area 214. The chart display can present data in any form of chart (e.g., histogram, bar, pie, multidimensional, etc.). Selection can be made to display results of the filtering and analysis as a chart, a table, or both.

Toolbar 230 can provide user interface functions as tabs, drop down list boxes (DDLB), and buttons to provide a robust control platform for the user. These tools help the user to select the filter analysis on BW data accessed by a user. For example, a "close" tab function (or radio button, icon, etc.) closes the report being viewed.

The "view" tab function can save the current report view (with naming selection at save time), and manage the report views themselves. The "manage views" function can set a report view as default, rename a report, and/or delete personal report views. The layout of the report and display settings can be changed by the "settings" function. A "reports view" function provides for reports to be opened from a reports list and from embedded reports. Views and selection can also be made by DDLB box selection.

A user can customize the parameters to identify deviations from threshold values and/or intervals, by accessing an "exceptions" function and defining the exception. Data conforming to a defined exception can be highlighted in the results pane. For example, if product revenue is a selected parameter, an exception can be defined for any products with revenue below a certain threshold. Products above a threshold can be highlighted as well.

Figure 3:
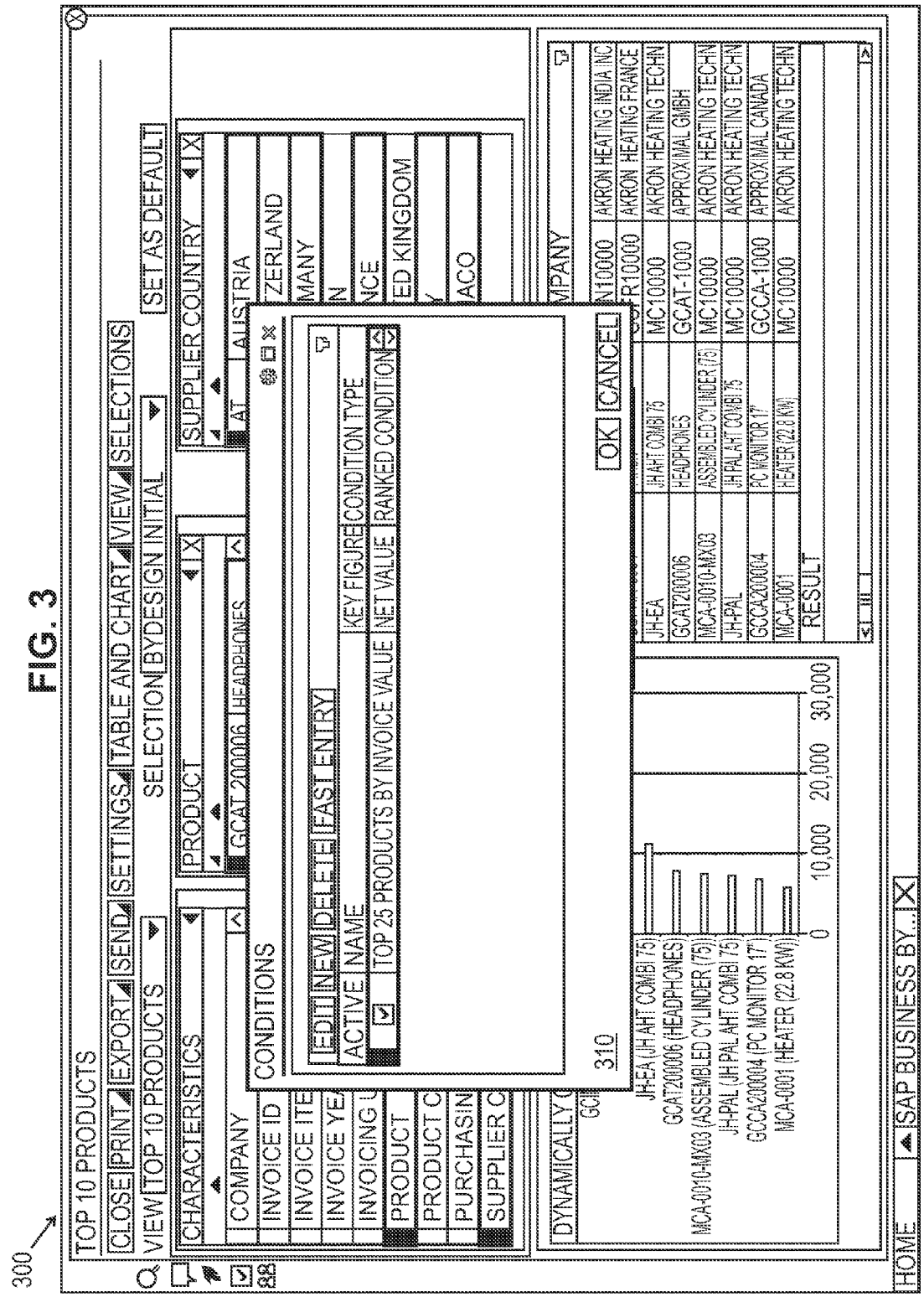
FIG. 3 depicts an interactive web browser interface in accordance with an embodiment.

A "conditions" function provides for restriction of the results area of a report in accordance with certain criteria (for example, top 10 products, bottom 25 sales personnel by volume or by revenue). In one embodiment, the "conditions" function restricts the results displayed in a report; but does not restrict the value available with characteristics in the quick filter area. As an example, FIG. 3 depicts an interactive web browser with conditions description box 310. The conditions description box defines a condition with the name "Top 25 Products by Invoice Value," which is an active condition for this instantiation of the interactive web browser. The condition uses the key figure value "net value" and is a ranked condition type.

Display setting for the report can be edited by selecting, Table or Chart function buttons. The Selections tab provides for filter and variables in the Selection area, and manages selections. By default, the Selection area is closed.

Print tab prints the report as a table and/or chart, independent of the current display selection. The Export tab causes the report to be exported in Microsoft Excel in XML format. Note that the report opens in read only mode. To perform ad-hoc analyses, the report is opened in Microsoft Excel. The report can be sent as an e-mail attachment or as a link by selection an option under the Send tab. The Table and Chart tab toggles the display to a table, chart, or both table and chart. In one embodiment, the table and the chart can be independent areas of result display pane 210, where the table and the chart can have independent filtering to provide alternative granularity of details for data that has at least one characteristic in common.

The View DDLB 232 shows the report view that is displayed in the Web browser. The dropdown list displays the report views that are available with the corresponding report. A report view is a modified view of the data available with a report. One or more views for a report can be defined by saving the current status of a report. The Selections DDLB 234 shows the saved set of values for filter and variables currently used with the report. The dropdown list shows the selections available with the report.

By clicking Selections and choosing Manage a user can set a selection as default, rename, or delete selections. Set As Default sets the current report view and defined selection as default. Selections can also be set as default in the Selection area. For selections, the last set default is valid whether the default is set in the Web browser or from the Selection area.

Characteristics list box in filter pane 220 allows a user to select from all characteristic parameters available with a report. The Characteristics list box contains the characteristics available with the report. To display the parameter values available with a characteristic, a user selects the characteristic. The characteristic, and its list of parameter values, appears to the right of the Characteristics list box. Successive characteristic selections are displayed in an expandable manner in filter pane 220. De-selection of a characteristic collapses the filter pane 220.

Values can then be selected and deselected. To support a quick selection of values, the list boxes provide sorting and filter functions for values. Selection of a characteristic's parameter triggers the selection of adaptive algorithms that configure one or more adaptive filter(s) which act on the business intelligence data accessed by the user. In accordance with an embodiment, the report data which is displayed in the results display pane 210 changes when parameter selection is made in the filter pane.

Removal (de-selection) of a characteristic's parameter in the filter pane is reflected in the displayed results. The parameter values available with the characteristics can be restricted to the value selections that are set using the variables in the Selection area. Any changes made to the value selections for variables in the selection affect the value selections available to be filtered for a characteristic. The system resets any filter value selections when selection changes are made.

The order of characteristics in the Characteristics list box and the order as displayed in the report can be set using characteristic settings. The order of characteristics in the Characteristics list box is alphabetical, starting with selected characteristics, and then the available characteristics. The order of characteristics selected to filter has no effect on the order of characteristics as displayed in the report.

From within filter pane 220, selection can be made of "characteristics" function from where parameters for characteristics (e.g., text attributes such as product, customer, etc.) to be displayed in the report can be selected. A "key figures" function provides a selection of parameters of key figures (e.g., numeric values such as revenue, unit sales, cost of goods, etc.) for display in the report. Selection of the "key figures: function will expand the parameters into the filter pane area, where a user can select one or more key figures or define their order.

Selection of the "characteristics" causes an expansion/collapse of the parameters into the filer pane. For example, selection of "Product" and "Supplier Country" under characteristics causes the interactive web browser to display a list of product parameters 222 and a list of supplier countries 226. The list of supplier countries is dependent on the product selection parameters. When product is first selected, all products of the accessed businesses intelligence data are listed. When the "supplier countries" list is selected, all countries having suppliers for the selected product(s) is included in the supplier country list 226.

In one embodiment, if supplier country is selected first, all countries with suppliers for the accessed business intelligence data are listed. If the user selects product list from the characteristics box, and then selects a subset of products from parameters list 222, the list of supplier countries is then modified to include only those countries that supply the product(s) selected by the user. These selections are reflected in the charts and/or tables in the result display pane by adaptive algorithms that are triggered by the user selection(s) and configure one or more adaptive filter(s) in adaptive filter unit 115.

In cells of reports displayed in table format, the context menu can be used for further navigation and analysis. Using the context menu, existing documents related to a value can be viewed. By selecting (e.g., highlighting, clicking, etc.) a report cell, the documents and reports are displayed. For example, navigation to a preceding document, such as a purchase request, an overview document that provides information about a customer, or to another report is possible by selecting a cell in the tabular report.

A user is provided with the ability to have characteristics used for filtering, but not be displayed in the results pane For example, the accessed business intelligence data can be filtered with parameters based on region (Asia Pacific, Europe zone, U.S., etc.), but the user only has the amount of product and net sales displayed in the results pane. The user is provided with the flexibility to decide what is important when working with the selected report and accessed business intelligence data.

Figure 4:
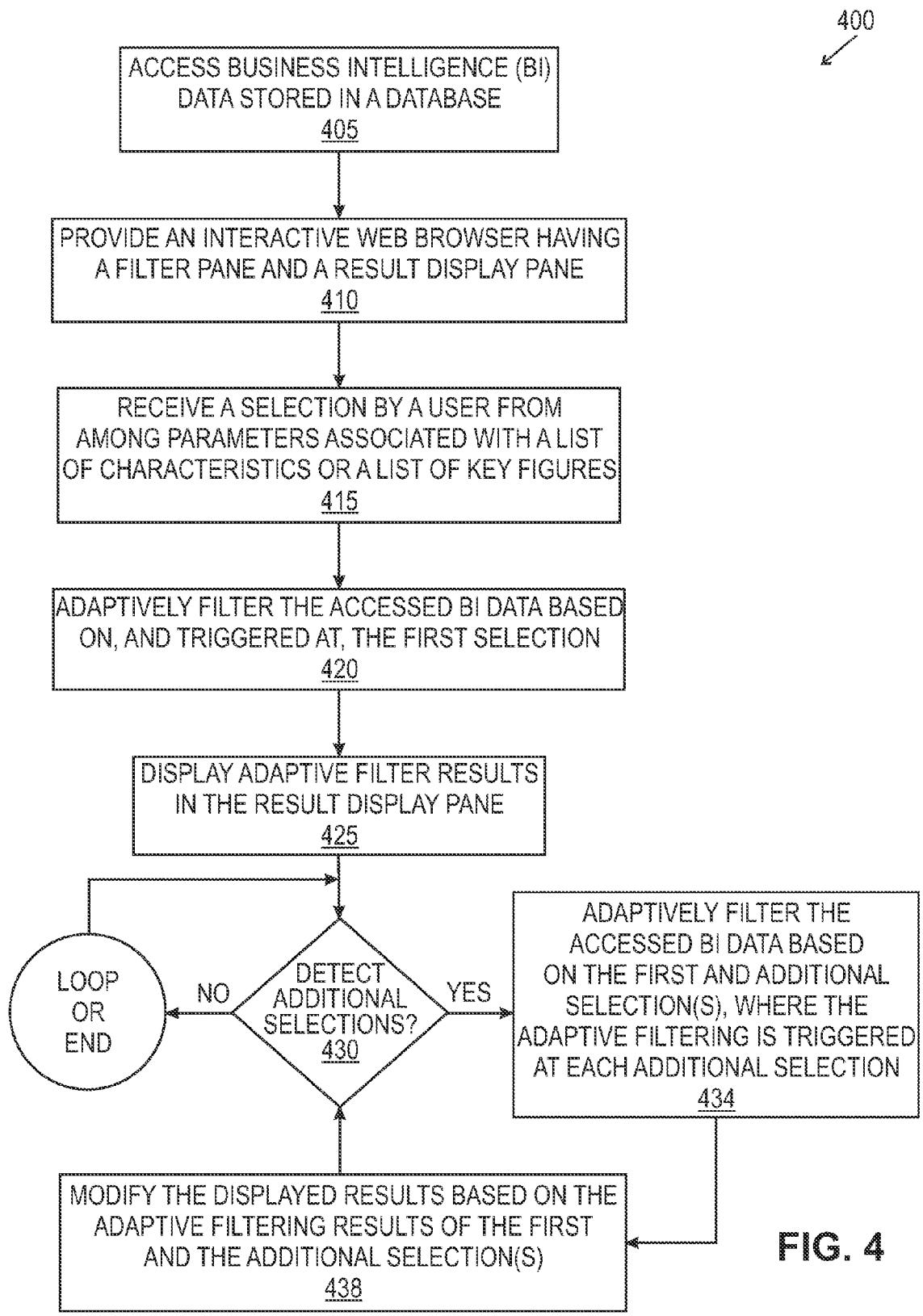
FIG. 4 depicts a process in accordance with an embodiment.

FIG. 4 depicts process 400 for providing an interactive web browser that displays adaptively filtered business intelligence data in accordance with an embodiment. Business intelligence data can be accessed, step 405, from a BW database. An interactive web browser is provided, step 410. The web browser has a filter pane and a results display pane. A user selection is received, step 415. The user selection can be parameters associated with characteristics and/or key figures of the accessed business intelligence data. When the user selection at the web browser is detected, a filter bank is triggered to adaptively filter (step 420) the business intelligence data. The filters are adapted by implementing predetermined filter descriptions and algorithms that describe filter (and/or sort) functions. The adaptive filter output is displayed, step 425, at the interactive web browser in a results pane. If additional parameter selections are detected, step 430, the adaptive filters are triggered to implement additional filtering descriptions/algorithms to filter the accessed business intelligence data. This additionally filtered result set is displayed at the web browser, step 438. If no further additional selections are detected at step 430, process 400 can enter a loop at step 430 awaiting detection of additional selections, or process 400 can end.

In accordance with an embodiment, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for providing an interactive GUI through which a user can select parameters for one or more adaptive filters to act on data and display the adaptively filtered result(s).

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and data configurations have been described herein, note that any number of other configurations may be provided in accordance with embodiments of the invention. Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A computer-implemented method for adaptive data visualization, the method comprising:
   accessing business intelligence data stored in a database;
   providing on a computing device display an interactive web browser having a filter pane and a result display pane, the filter pane including at least one of a list of characteristics and a list of key figures;
   displaying the accessed business intelligence data in the result display pane;
   in response to a user selection, displaying in the filter pane a list of parameters associated with at least one of the list of characteristics and the list of key figures, the list of characteristics and the list of key figures based on the accessed business intelligence data displayed in the result display pane;
   receiving a first selection by a user from among the list of parameters;
   configuring functionality of the adaptive filter by selecting predetermined filtering algorithms corresponding to the first selection;
   filtering the accessed business intelligence data with an adaptive filter based on the first selection, triggering the adaptive filter to filter the accessed business intelligence data;
   displaying results of the adaptive filtering in the result display pane, with no change made to the list of parameters in the list of characteristics and in the list of key figures;

receiving a second selection by a user from among the parameters associated with at least one of the list of characteristics and the list of key figures;

further configuring the functionality of the adaptive filter by selecting predetermined filtering algorithms corresponding to the second selection;

adaptively filtering the accessed business intelligence data based on the first selection and the second selection, the second selection triggering the adaptive filter; and modifying the displayed results based on the adaptive filtering results of the first and the second selections, with no change made to the list of parameters in the list of characteristics and in the list of key figures.

2. The method of claim 1 further including:

receiving one or more additional parameter selections from among the parameters associated with at least one of the list of characteristics and the list of key figures;

further configuring the functionality of the adaptive filter by selecting predetermined filtering algorithms corresponding to the one or more additional parameter selections; and triggering the adaptive filter with each selection of an additional parameter.

3. The method of claim 1 further including implementing the selected parameters in the adaptive filter in a predetermined order that is independent of an order of selecting the parameters.

4. The method of claim 1, further including expanding and collapsing the list of characteristics and the list of key figures within the filter pane in response to a user interaction.

5. The method of claim 1, the displaying results step further including at least one of displaying the results in a chart format and a tabular format.

6. The method of claim 1, the adaptive filtering including implementing filtering characteristics based on at least one of predetermined filter descriptions and predetermined filter algorithms.

7. A non-transitory computer readable medium having stored thereon instructions which when executed by a processor cause the processor to perform the method of:

accessing business intelligence data stored in a database;

providing an interactive web browser having a filter pane and a result display pane, the filter pane including at least one of a list of characteristics and a list of key figures;

displaying the accessed business intelligence data in the result display pane;

in response to a user selection, displaying in the filter pane a list of parameters associated with at least one of the list of characteristics and the list of key figures, the list of characteristics and the list of key figures based on the accessed business intelligence data displayed in the result display pane;

receiving a first selection by a user from among the list of parameters;

configuring functionality of the adaptive filter by selecting predetermined filtering algorithms corresponding to the first selection;

filtering the accessed business intelligence data with an adaptive filter based on the first selection, the first selection triggering the adaptive filter to filter the accessed business intelligence data;

displaying results of the adaptive filtering in the result display pane, with no change made to the list of parameters in the list of characteristics and in the list of key figures;

receiving a second selection by a user from among the parameters associated with one of the list of characteristics or associated with the list of key figures;

further configuring the functionality of the adaptive filter by selecting predetermined filtering algorithms corresponding to the second selection;

adaptively filtering the accessed business intelligence data based on the first selection and the second selection, the second selection triggering the adaptive filter; and modifying the displayed results based on the adaptive filtering results of the first and the second selections, with no change made to the list of parameters in the list of characteristics and in the list of key figures.

8. The non-transitory computer readable medium of claim 7, further including executable instructions to cause a processor to perform the steps of:

receiving one or more additional parameter selections from among the parameters associated with at least one of the list of characteristics and the list of key figures;

further configuring the functionality of the adaptive filter by selecting predetermined filtering algorithms corresponding to the one or more additional parameter selections; and triggering the adaptive filter with each selection of an additional parameter.

9. The non-transitory computer readable medium of claim 7, further including executable instructions to cause a processor to perform the step of implementing the selected parameters in the adaptive filter in a predetermined order that is independent of an order of selecting the parameters.

10. The non-transitory computer readable medium of claim 7, further including executable instructions to cause a processor to perform the steps of expanding and collapsing the list of characteristics and the list of key figures within the filter pane in response to a user interaction.

11. The non-transitory computer readable medium of claim 7, further including executable instructions to cause a processor to implement the adaptive filtering by including implementing filtering characteristics based on at least one of predetermined filter descriptions and predetermined filter algorithms.

12. A system comprising:

a processor in communication with an electronic communication network through an input/output port;

a business warehouse database coupled to the electronic communication network, the business warehouse database containing business intelligence data;

the processor configured to:

control a display unit configured to display an interactive web browser having a filter pane and a result display pane, the filter pane including at least one of a list of characteristics and a list of key figures;

control the display unit to display the business intelligence data in the result display pane;

control a detection unit configured to detect a selection made by a user at the interactive web browser;

in response to the selection, control the display unit to display in the filter pane a list of parameters associated with at least one of the list of characteristics and the list of key figures, the list of characteristics and the list of key figures based on the business intelligence data displayed in the result display pane;

control a detection unit configured to detect a first selection of one or more parameters made by a user at the interactive web browser;

configure functionality of an adaptive filter by selecting predetermined filtering algorithms corresponding to the first selection of the one or more parameters;

control the adaptive filter configured to filter at least a portion of the business intelligence data based on the first selection;

control the display unit to display results of the adaptive filtering in the result display pane, with no change made to the list of parameters;

control a detection unit configured to detect a second selection of one or more parameters made by a user at the interactive web browser;

configure functionality of an adaptive filter by selecting predetermined filtering algorithms corresponding to the second selection of the one or more parameters;

control the adaptive filter configured to filter at least a portion of the business intelligence data based on the second selection;

control the display unit to display results of the adaptive filtering in the result display pane, with no change made to the list of parameters;

the adaptive filters configured to be triggered at the time of the user selections.

13. The system of claim 12, wherein the display unit updates the display information as the business intelligence data is filtered.

14. The system of claim 12, wherein the adaptive filter is a bank of filters.

15. The system of claim 12, wherein the interactive web browser is displayed on a computing device connected to the electronic communication network and the processor is located in a server remote to the computing device.

16. The system of claim 12, wherein the processor is located local to a computing device that includes a display for the interactive web browser.

17. The system of claim 12, including the adaptive filters configured to implement filtering characteristics based on at least one of predetermined filter descriptions and predetermined filter algorithms.

* * * * *